(12) United States Patent
Wang et al.

(10) Patent No.: US 7,530,541 B2
(45) Date of Patent: May 12, 2009

(54) FLAT PANEL DISPLAY WITH PIVOT MECHANISM

(75) Inventors: Te-Hsu Wang, Miao-Li (TW); Ming-Chuan Li, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 30 days.

(21) Appl. No.: 11/728,545

(22) Filed: Mar. 26, 2007

(65) Prior Publication Data
US 2007/0223186 A1 Sep. 27, 2007

(30) Foreign Application Priority Data
Mar. 24, 2006 (TW) .............. 95110321 A

(51) Int. Cl.
*E05C 17/64* (2006.01)
(52) U.S. Cl. ............. 248/284.1; 248/921; 248/922; 16/343
(58) Field of Classification Search ............. 248/284.1, 248/286.1, 287.1, 917–924; 16/343, 346, 16/337, 338; 361/681–683
See application file for complete search history.

(56) References Cited

U.S. PATENT DOCUMENTS

| | | | | |
|---|---|---|---|---|
| 5,702,197 A * | 12/1997 | Chen | ........................... | 403/166 |
| 6,018,847 A * | 2/2000 | Lu | ........................... | 16/337 |
| 6,437,975 B1 | 8/2002 | Huang | | |
| 6,581,893 B1 * | 6/2003 | Lu | ........................... | 248/291.1 |
| 6,666,422 B1 * | 12/2003 | Lu et al. | ................... | 248/291.1 |
| 6,813,813 B2 * | 11/2004 | Lu et al. | ....................... | 16/342 |
| 7,257,861 B2 * | 8/2007 | Lee et al. | ....................... | 16/338 |
| 2003/0121124 A1 * | 7/2003 | Chen | ........................... | 16/339 |
| 2003/0122046 A1 * | 7/2003 | Huong | .................... | 248/291.1 |
| 2007/0152111 A1 * | 7/2007 | Tang et al. | ............... | 248/122.1 |

* cited by examiner

*Primary Examiner*—Korie H. Chan
*Assistant Examiner*—Steven Marsh
(74) *Attorney, Agent, or Firm*—Wei Te Chung

(57) ABSTRACT

An exemplary flat panel display (2) includes: a display module (21), two connecting pieces (231, 233) fixed to a back side of the display module, a supporting member (237) having a first side plate (2372) and a second side plate (2373) having a screw hole (2375) therein, a fixing member (235) connecting a first one of the connecting pieces and the first side plate of the supporting member such that the first connecting piece is pivotable relative to the first side plate, and a first bolt (239). One end of the first bolt includes a screw thread (2391) thereon. The first bolt extends through a second one of the connecting pieces and threadingly engages in the screw hole of the second side plate of the supporting member, such that the second connecting piece is connected to the second side plate and pivotable relative to the second side plate.

8 Claims, 5 Drawing Sheets

FLAT PANEL DISPLAY WITH PIVOT MECHANISM

FIELD OF THE INVENTION

The present invention relates to display devices, and more particularly to a flat panel display having a display module pivotally attached to a base.

BACKGROUND

Display devices have been widely applied to various electronic equipment in which messages or pictures need to be displayed, such as notebook computers and personal computers. Because a typical display device has an optimal viewing angle, it is desirable that the display device can be inclined forward or backward to attain the optimal viewing angle for any particular user.

Referring to FIG. 4, a conventional flat panel display 1 includes a display module 11, a base 15, and a pivot mechanism 13. The display module 11 is rotatably mounted on the base 15 via the pivot mechanism 13.

The pivot mechanism 13 includes a first connecting piece 131, a second connecting piece 133, two fixing members 135, and a U-shaped supporting bracket 137. The first and second connecting pieces 131, 133 are fixed to the display module 11, and are engaged with the U-shaped supporting bracket 137 via the fixing members 135, respectively.

Also referring to FIG. 5, an exploded, back view of the flat panel display 1 is shown. The first connecting piece 131 includes a main plate 1311, and a side plate 1312 perpendicularly extending from the main plate 1311. The main and side plates 1311, 1312 cooperatively give the first connecting piece 131 an L-shaped form. The main plate 1311 is fixed to a back side of the display module 11 via screws (not labeled), and the side plate 1312 includes a positioning hole 1314 therein. The second connecting piece 133 has a structure similar to that of the first connecting piece 131. The second connecting piece 133 includes a main plate 1331, and a side plate 1332 perpendicularly extending from the main plate 1331. The main and side plates 1331, 1332 cooperatively give the second connecting piece 133 an L-shaped form. The main plate 1331 is fixed to the back side of the display module 11 via screws (not labeled), and the side plate 1332 includes a positioning hole 1334 therein.

The supporting bracket 137 includes a main plate 1371, and two side plates 1372, 1373 extending perpendicularly up from the main plate 1371. The main and side plates 1371, 1372, 1373 cooperatively give the supporting bracket 137 a U-shaped frame form. The main plate 1371 is fixed to the base 15 via screws (not labeled), and the side plates 1372, 1373 each include a through hole 1374 therein.

Each of the fixing members 135 is substantially a hinge, and includes a bolt 1350, a plurality of washers 1351, and a threaded nut 1353. One end of the bolt 1350 includes a screw thread (not labeled) thereon, which is mated with the threaded nut 1353. All the washers 1351 of the fixing member 135 are coaxial with each other.

In assembly of one of the fixing members 135, the bolt 1350 is extended through the positioning hole 1314, a group of the washers 1351, the corresponding through hole 1374, and another group of the washers 1351, and is then mated with the threaded nut 1353. The other fixing member 135 is similarly assembled. Thereby, the first and second connecting pieces 131, 133 are pivotally connected to the side plates 1373, 1372 of the supporting bracket 137 respectively. After assembly, the display module 11 may be turned relative to the base 15 via rotating of the pivot mechanism 13. However, typically, a large number of washers 1351 are needed for each fixing member 135 of the pivot mechanism 13. This makes the flat panel display 1 relatively costly. In addition, the process of attaching the pivot mechanism 13 to the display module 11 is unduly complicated.

Accordingly, what is needed is a flat panel display that can overcome the above-described deficiencies.

SUMMARY

An exemplary flat panel display includes: a display module, two connecting pieces fixed to a back side of the display module, a supporting member having a first side plate and a second side plate having a screw hole therein, a fixing member connecting a first one of the connecting pieces and the first side plate of the supporting member such that the first connecting piece is pivotable relative to the first side plate, and a first bolt. One end of the first bolt includes a screw thread thereon. The first bolt extends through a second one of the connecting pieces and threadingly engages in the screw hole of the second side plate of the supporting member, such that the second connecting piece is connected to the second side plate and pivotable relative to the second side plate.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
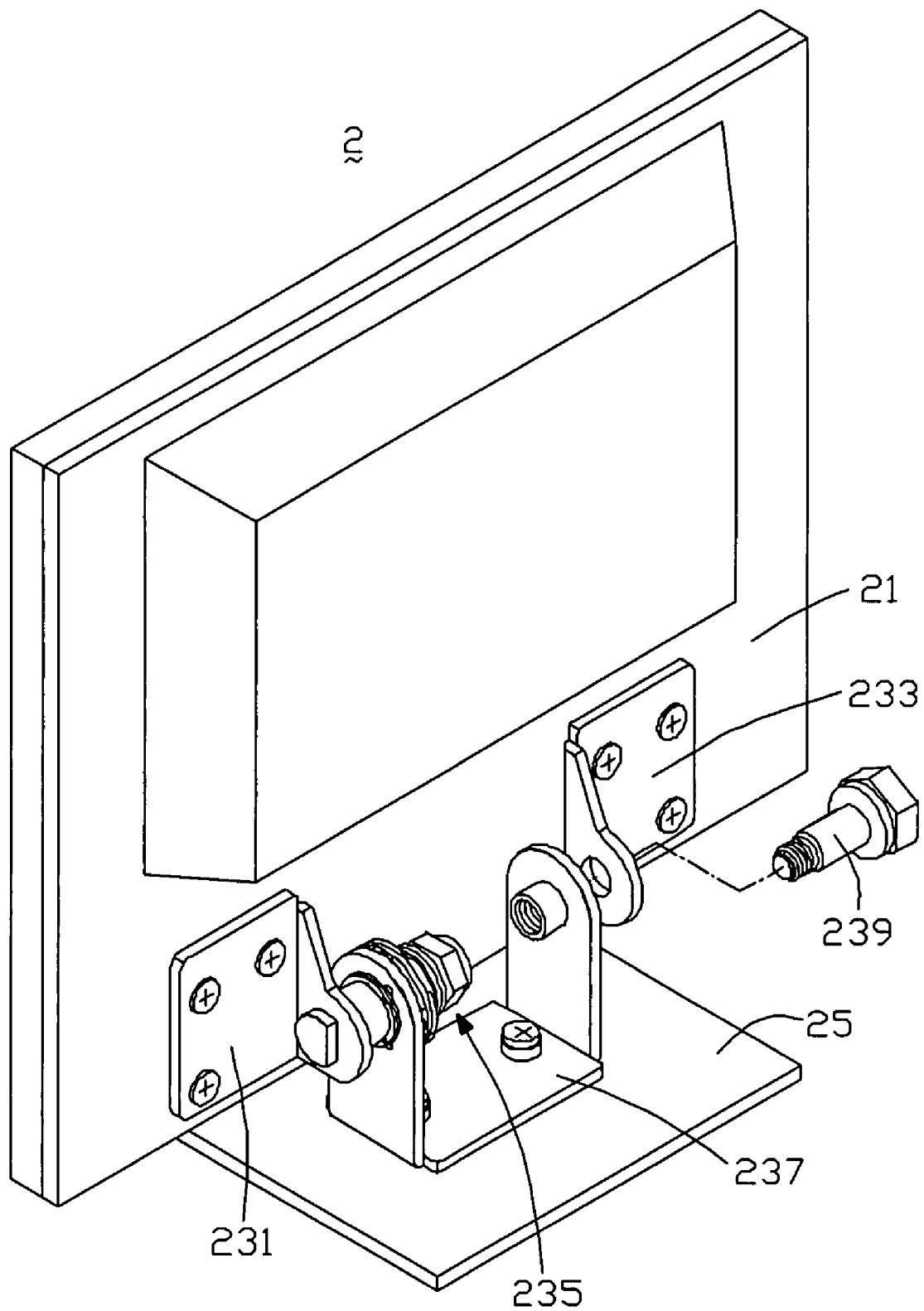
FIG. 1 is a partly exploded, isometric back view of a flat panel display according to an exemplary embodiment of the present invention.
Figure 2:
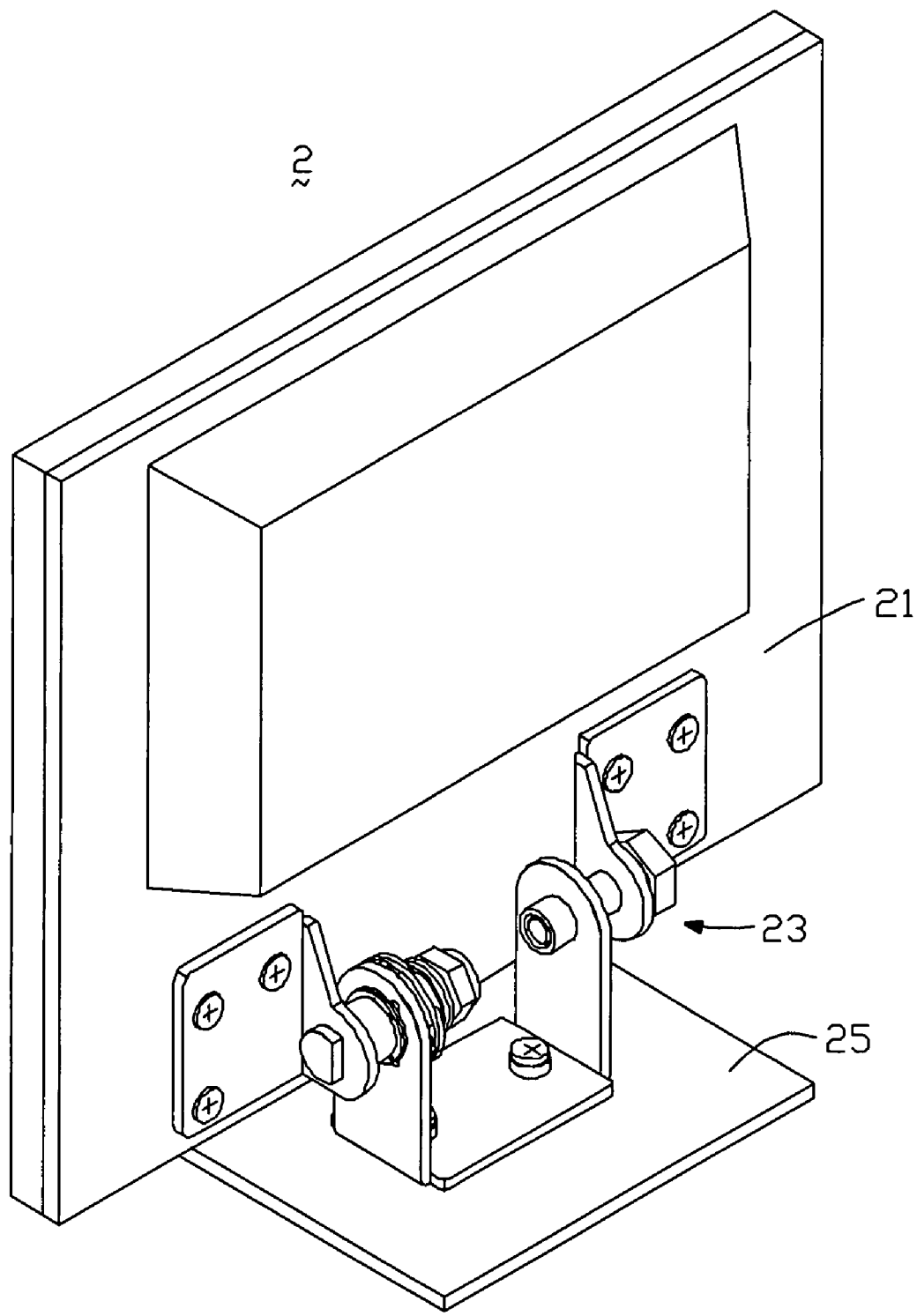
FIG. 2 is an assembled view of the flat panel display of FIG. 1.

Referring to FIGS. 1 and 2, a flat panel display 2 includes a display module 21, a pivot mechanism 23, and a base 25.

The display module 21 may for example be a liquid crystal display (LCD) module, a plasma display module, or a light emitting diode (LED) display module. The display module 21 is engaged with the base 25 via the pivot mechanism 23, and is capable of rotating relative to the base 25.

Referring to FIG. 1, a partly exploded, isometric back view of the flat panel display 2 is shown. The pivot mechanism 23 includes a first connecting piece 231, a second connecting piece 233, a fixing member 235, a U-shaped supporting bracket 237, and a bolt 239. The first and second connecting pieces 231, 233 are fixed to the display module 21 by fasteners such as screws (not labeled), and the supporting bracket 237 is fixed to the base 25 by fasteners such as screws (not labeled). The first connecting piece 231 is pivotally engaged with the supporting bracket 237 via the fixing member 235, and the second connecting piece 233 is pivotally engaged with the supporting bracket 237 via the bolt 239.

Figure 3:
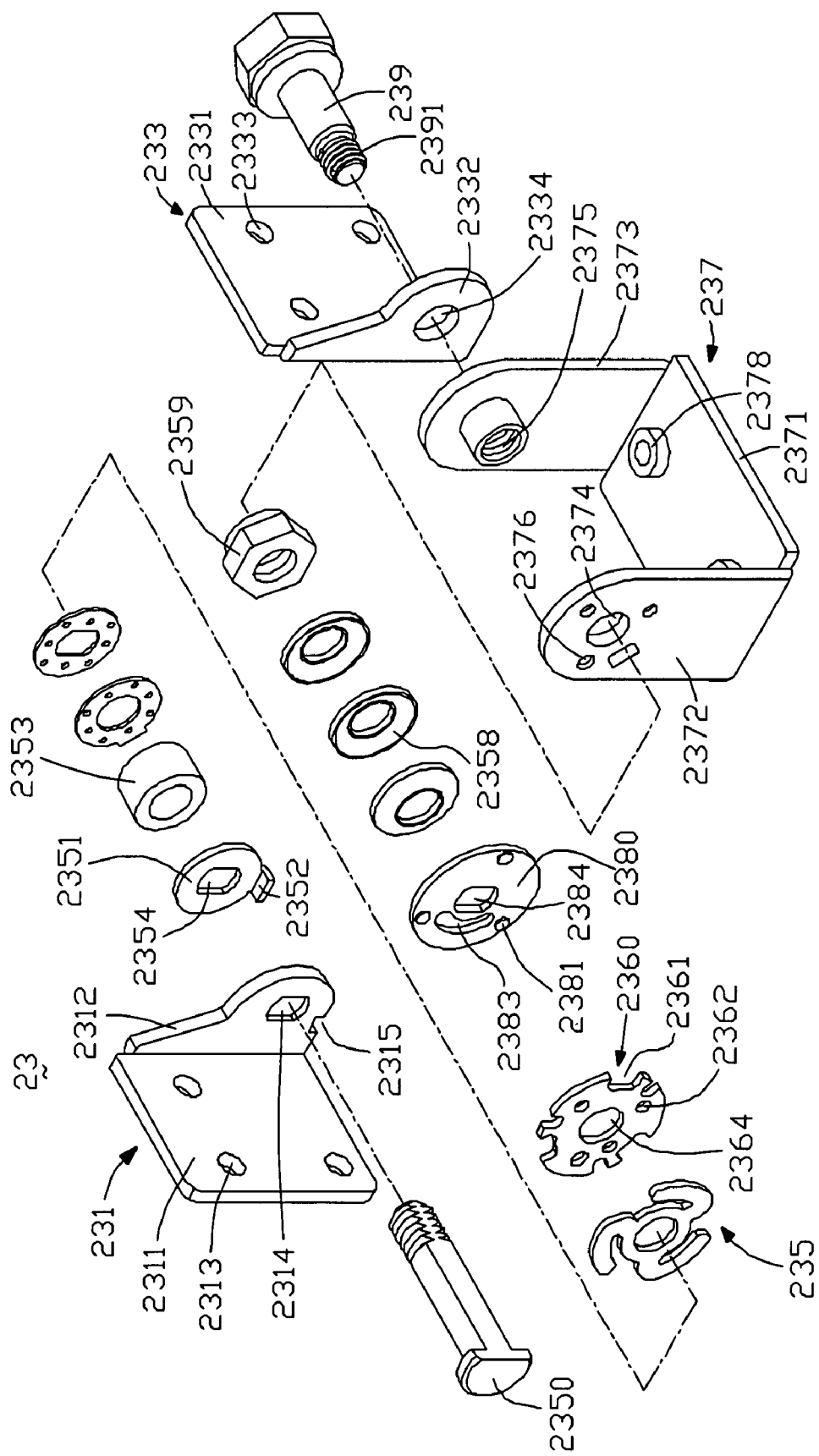
FIG. 3 is an enlarged, exploded view of a pivot mechanism of the flat panel display of FIG. 1.
Figure 4:
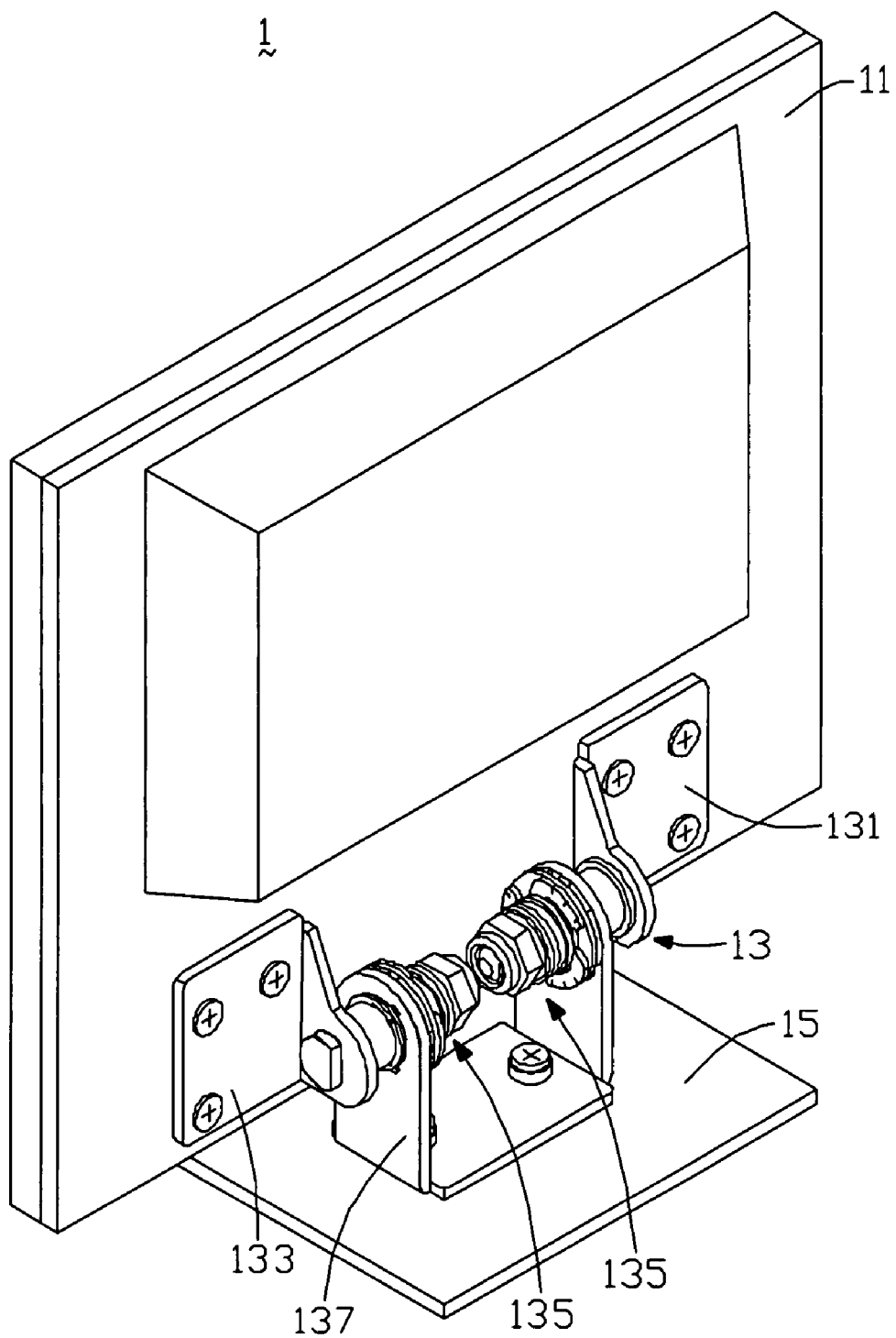
FIG. 4 is an isometric back view of a conventional flat panel display.
Figure 5:
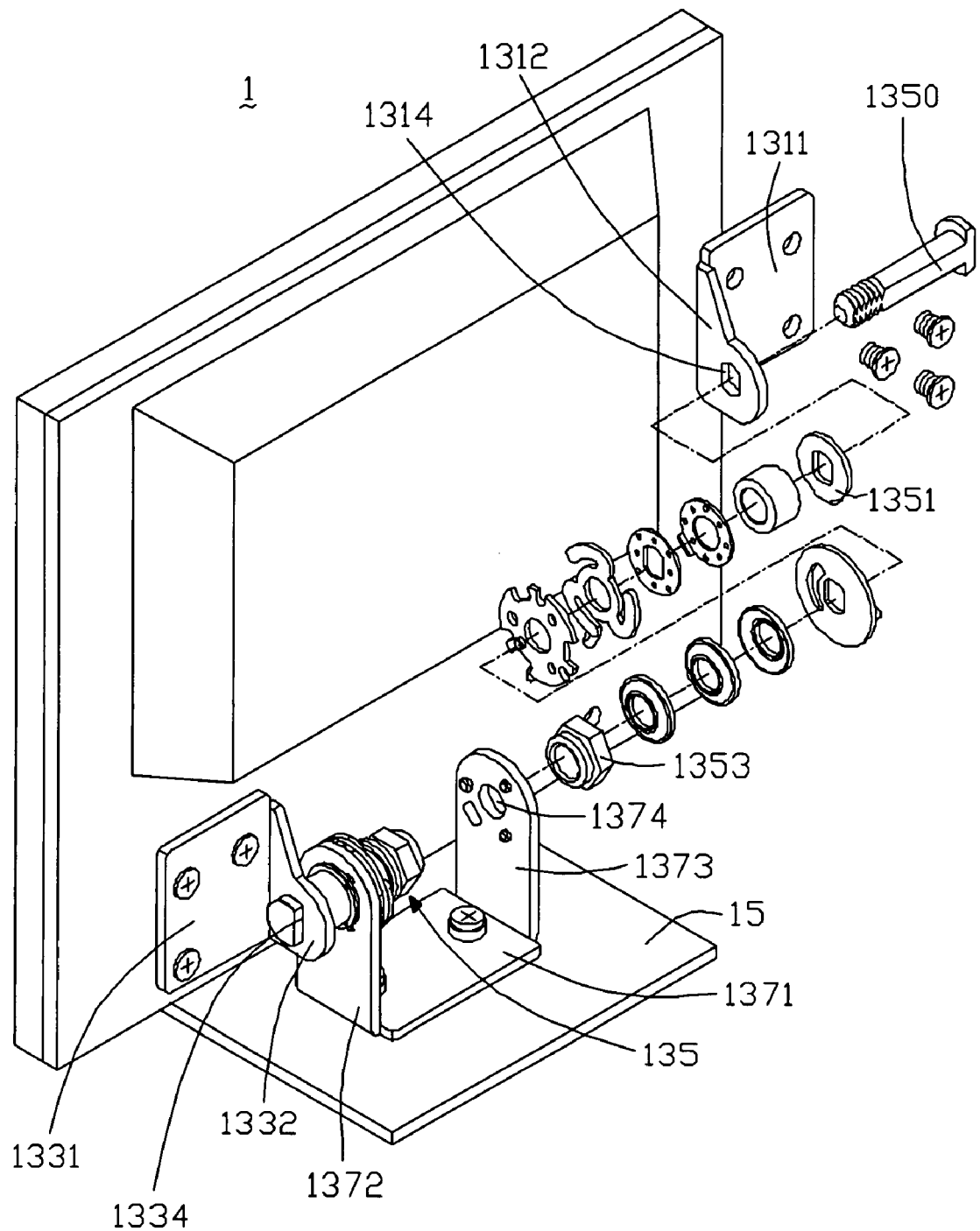
FIG. 5 is an exploded view of the flat panel display of FIG. 4.

Also referring to FIG. 3, an exploded, enlarged view of the pivot mechanism 23 is shown. The first connecting piece 231 includes a main plate 2311, and a side plate 2312 perpendicularly extending from the main plate 2311. The main and side plates 2311, 2312 cooperatively give the first connecting piece 231 an L-shaped form. The main plate 2311 includes three screw holes 2313 therein. The side plate 2312 includes a positioning hole 2314 formed at a middle portion thereof, and a cutout 2315 formed at a bottom portion thereof.

The second connecting piece 233 has a structure similar to that of the first connecting piece 231. The second connecting piece 233 includes a main plate 2331, and a side plate 2332 perpendicularly extending from the main plate 2331. The main and side plates 2331, 2332 cooperatively give the second connecting piece 233 an L-shaped form. The main plate 2331 includes three screw holes 2333 therein. The side plate 2332 includes a positioning hole 2334 formed at a middle portion thereof.

The supporting bracket 237 includes a main plate 2371, a first side plates 2372, and a second side plate 2373. The first and second side plates 2372, 2373 perpendicularly extend from the main plate 2371, thereby giving the supporting bracket 237 a U-shaped frame form. The first side plate 2372 includes a through hole 2374 formed at an upper portion thereof, and three screw holes 2376 surrounding the through hole 2374. The second side plate 2373 includes a screw hole 2375, and the main plate 2371 includes two screw holes 2378 therein.

The bolt 239 has the shape of a round column, with an end of the bolt 239 having a screw thread 2391.

The fixing member 235 can be substantially a two stage hinge. In the exemplary embodiment, the fixing member 235 includes a bolt 2350, a blocking piece 2351, a plurality of washers 2353, a fixing piece 2360, a rotating piece 2380, a plurality of elastic pieces 2358, and a threaded nut 2359. One end of the bolt 2350 includes a screw thread (not labeled) thereon, which is capable of mating with the threaded nut 2359. The blocking piece 2351, the plurality of washers 2353, the fixing piece 2360, the rotating piece 2380, and the plurality of elastic pieces 2358 are coaxial with each other. In the illustrated embodiment, the elastic pieces 2358 are elastic washers.

The blocking piece 2351 includes a block 2352 formed at an edge portion thereof, and a positioning hole 2354 formed at a middle portion thereof. The block 2352 can be received in the cutout 2315 of the first connecting piece 231. The blocking piece 2351 is fixed to the bolt 2350 when the bolt 2350 is extended through the positioning hole 2314 of the first connecting piece 231 and the positioning hole 2354 of the blocking piece 2351 in sequence.

The fixing piece 2360 includes three cutouts 2361 formed in an edge portion thereof, a central through hole 2364, three fixing holes 2362 surrounding the through hole 2364, and a block (not visible) extending perpendicularly from an edge portion thereof. The three fixing holes 2362 corresponds to the screw holes 2376 of the supporting bracket 237. The bolt 2350 can rotate relative to the fixing piece 2360 when the bolt 2350 is extended through the through hole 2364 of the fixing piece 2360. Each cutout 2361 is generally arc-shaped, and an arc length of each cutout 2361 subtends an angle of 25°.

The rotating piece 2380 includes a central positioning hole 2384, three protrusions 2381 surrounding the positioning hole 2384, and a blocking slot 2383. Each of the protrusions 2381 includes a rounded outmost extremity (not labeled), and can be received in a corresponding cutout 2361. Each protrusion 2381 can rotate in the corresponding cutout 2361 in a range of 0° to 25°. The blocking slot 2383 is located between the positioning hole 2384 and an edge of the rotating piece 2380, generally between two of the protrusions 2381. The blocking slot 2383 is generally arc-shaped, and an arc length of the blocking slot 2383 subtends an angle of 90°. The block of the fixing piece 2360 is received in the blocking slot 2383, and the block of the fixing piece 2360 can rotate in the blocking slot 2383 in a range of 0° to 90°. The rotating piece 2380 is non-rotatable relative to the bolt 2350 when the bolt 2350 is extended through the positioning hole 2384 of the rotating piece 2380.

The plurality of washers 2353 is disposed between the blocking piece 2351 and the fixing piece 2360, to enhance the friction between the bolt 2350 and certain components (such as the blocking piece 2351 and the fixing piece 2360) located around the bolt 2350. The plurality of elastic pieces 2358 is disposed between the rotating piece 2380 and the threaded nut 2359, to enhance the friction between the bolt 2350 and certain components (such as the rotating piece 2380) located around the bolt 2350.

In assembly, the bolt 2350 of the fixing member 235 is extended through the positioning hole 2314 of the first connecting piece 231, the blocking piece 2351, the plurality of washers 2353, the through hole 2374 of the supporting bracket 237, the fixing piece 2360, the rotating piece 2380, and the plurality of elastic pieces 2358, and is then mated with the threaded nut 2359. The first connecting piece 231, the fixing member 235, and the supporting bracket 237 are then assembled together by inserting screws (not shown) into the screw holes 2376 of the first side plate 2372 and engaging the screws in the fixing holes 2362 of the fixing piece 2360.

Then the bolt 239 is extended through the positioning hole 2334 of the second connecting piece 233, and is matingly received in the screw hole 2375 of the second side plate 2373 of the supporting bracket 237. The second connecting piece 233 is thus capable of rotating relative to the bolt 239.

The first and second connecting pieces 231, 233 are fixed to the back side of the display module 21 by inserting screws (not labeled) into the screw holes 2313, 2333 respectively, and engaging the screws (not labeled) in the back side of the display module 21. The supporting bracket 237 is fixed to the base 25 by inserting screws (not labeled) into the screw holes 2378 of the main plate 2371 and engaging the screws in the base 25.

After assembly, the first and second connecting pieces 231, 233, the bolts 2350, 239, the various components described above, and the threaded nut 2359 cooperatively form the pivot mechanism 23. A user can manually adjust an angle of the display module 21 relative to the base 25, with the first and second connecting pieces 231, 233 rotating in unison relative to the first and second side plates 2372, 2373 of the supporting bracket 237 during such adjustment. In addition, the fixing member 235 is used as a two stage hinge. That is, when the protrusions 2381 of the rotating piece 2380 rotate in the corresponding cutouts 2361 of the fixing piece 2360, the fixing member 235 can rotate in a range of 0° to 25° only. On the other hand, the protrusions 2381 can be released from the cutouts 2361 because the outmost extremities of the protrusions 2381 are rounded. The protrusions 2381 can be released from the cutouts 2361 by a user applying additional force to the display module 21 when the display module 21 has been rotated to a position where the protrusions 2381 have reached the end of their travel at respective ends of the cutouts 2361. However, when the protrusions 2381 are released from the cutouts 2361, the block of the fixing piece 2360 is still limited to rotating in the blocking slot 2383 of the rotating piece 2380. Therefore, the fixing member 235 can rotate in a range of 0° to 90°, but is limited to this range.

Whether the protrusions 2381 are in the cutouts 2361 or released from the cutouts 2361, friction between the connecting piece 231 and the fixing member 235, as well as friction between the connecting piece 233 and the bolt 239, is configured such that the user can rotate the display module 21 to a desired angle, and when the desired angle is reached the display module 21 simply stays secured in the desired position and does not move. The friction can be modulated via appropriately adjusting a position of the threaded nut 2359 along the screw thread of the bolt 2350, and/or via appropriately adjusting a position of the bolt 239 along the screw hole 2375. In this manner, the pivot mechanism 23 is more tightly fastened to or slightly released from a selected one or both of the connecting pieces 231, 233.

Advantageously, and unlike in a conventional flat panel display, the flat panel display 2 uses only a single fixing member 235 and the complementary bolt 239 to realize adjustment of the angle of the display module 21 relative to the base 25. That is, the fixing member 235 and the bolt 239 together with the first and second connecting pieces 231 and 233 provide the flat panel display 2 with a simple structure, relatively easy assembly, and reduced cost.

Further or alternative embodiments may include the following. In one example, the outmost extremity of each protrusion 2381 may be angular instead of being rounded. In such case, an edge portion of the fixing piece 2360 at each cutout 2360 is slanted, whereby the outmost extremity of the corresponding protrusion 2381 can be released from the cutout 2360. In another example, in addition to the outmost extremity of each protrusion 2381 having a rounded form, the edge portion of the fixing piece 2360 at each cutout 2360 can be slanted. Thereby, the rounded outmost extremity of the protrusion 2381 can be released from the cutout 2360. In further examples, the first and second connecting pieces 231, 232 can be fixed to any one or more of the following sides of the display module 21: the back side, an underside, and a front side.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flat panel display, comprising:
   a display module;
   two connecting pieces fixed to a back side of the display module, each connecting piece comprising a main plate and a side plate perpendicularly extending from the main plate, the main plate being fixed to the back side of the display module by fasteners, and each side plate comprising a first positioning hole;
   a supporting member comprising a first side plate, and a second side plate having a screw hole therein;
   a fixing member connecting a first one of the connecting pieces and the first side plate of the supporting member such that the first connecting piece is pivotable relative to the first side plate; and
   a first bolt, one end of the first bolt comprising a screw thread thereon, the first bolt extending through the first positioning hole of a second one of the connecting piece and threadingly engaging in the screw hole of the second side plate of the supporting member, such that the second connecting piece is connected to the second side plate and pivotable relative to the second side plate;
   wherein the fixing member comprises a second bolt, which extends through the first positioning hole of the first connecting piece; the fixing member further comprises a rotating piece and a fixing piece, the rotating piece comprises a second positioning hole, the fixing piece comprises a through hole, the second bolt extends through the second positioning hole such that the rotating piece is non-rotatable relative to the second bolt, and the second bolt extends through the through hole such that the second bolt is rotatable relative to the fixing piece;
   wherein the fixing member is a two stage hinge, which provides the display module with a first range of rotation angles and a second rage of rotation angles; and
   wherein the rotating piece further comprises at least one protrusion, the fixing piece further comprises at least one cutout movably receiving the at least one protrusion therein, and a limited range of movement of the at least one protrusion in the at least one cutout provides the display module with the first range of rotation angles.

2. The flat panel display as claimed in claim 1, wherein one end of the second bolt comprises a screw thread thereon.

3. The flat panel display as claimed in claim 2, wherein the fixing member further comprises a nut, and the second bolt mates with the nut via the screw thread.

4. The flat panel display as claimed in claim 1, wherein the fixing member further comprises a plurality of elastic washers, the second bolt extends through the elastic washers, and the elastic washers are adjacent to the rotating piece.

5. The flat panel display as claimed in claim 1, wherein the first range of rotation angles is 0° to 25°.

6. The flat panel display as claimed in claim 1, wherein the second range of rotation angles is 0° to 90°.

7. The flat panel display as claimed in claim 1, wherein the fixing piece further comprises a block, the rotating piece further comprises a slot movably receiving the block, and a limited range of movement of the block in the slot provides the display module with the second range of rotation angles.

8. The flat panel display as claimed in claim 7, wherein the second range of rotation angles is greater than the first range of rotation angles, and the display module is switchable from the first range of rotation angles to the second range of rotation angles by the application of additional external force to the display module when the display module has been rotated to a position where the at least one protrusion has reached the end of its travel at a respective end of the at least one cutout, such that the at least one protrusion is released from the at least one cutout.

* * * * *